April 7, 1970   A. M. GRIFFITH   3,505,446
FRICTION ELEMENTS
Filed Dec. 6, 1966
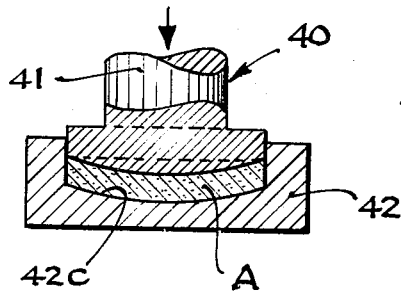
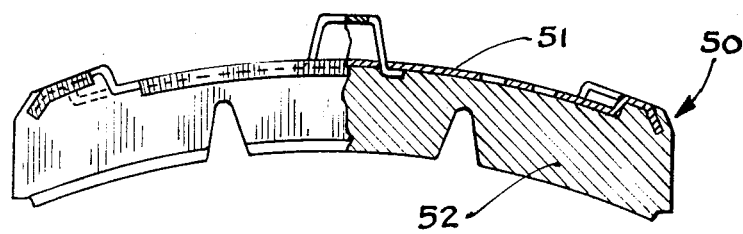
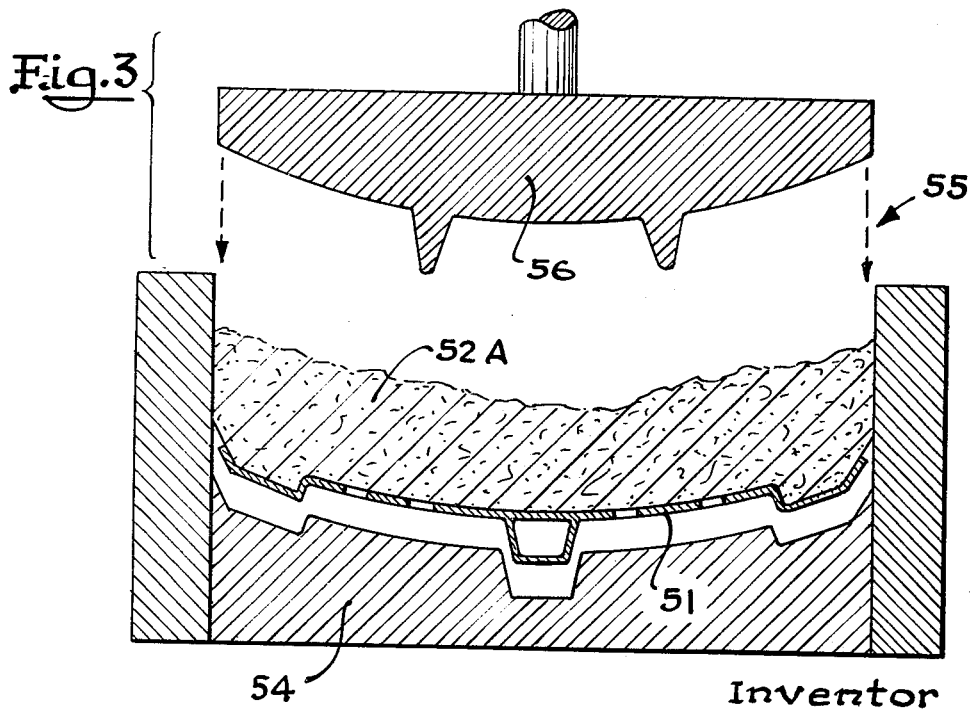
Inventor
Arvon M. Griffith
By Wallace, Kinzer and Dorn
Attorneys Patented Apr. 7, 1970

3,505,446
FRICTION ELEMENTS
Arvon M. Griffith, Valley Cottage, N.Y., assignor to Abex Corporation, New York, N.Y., a corporation of Delaware
Filed Dec. 6, 1966, Ser. No. 599,636
Int. Cl. B29c 25/00; B29h 9/00; F16d 69/00
U.S. Cl. 264—236                                4 Claims This invention relates to composition friction elements and in particular to those that are inclusive of inorganic filler ingredients bonded by a thermosetting organic binder as an essential ingredient in the bond.

Composition friction elements such as brake linings, clutch facings and the like are conventionally composed of long-wearing filler particles and an organic thermosetting binder in a highly densified state. Densification is ordinarily obtained by consolidating the mixed ingredients in a press for a substantial period of time while employing relatively high temperatures to cure the binder. The binder becomes the matrix containing the dispersed phase represented by the fillers.

The filler particles may be of a wide variety depending upon the ultimate friction and wear characteristics desired. For example, the filler particles ordinarily include a heat-resistant reinforcer such as asbestos, and in addition, metallic particles such as cast iron and/or friction enhancing minerals. It is also customary to include other friction enhancers such as polymers derived from cashew nut shell oil, and friction modifiers such as various forms of graphite and/or lead sulphide.

Typical disclosures concerning the foregoing are represented by United States Patent Nos. 2,901,456 and 3,168,487.

The binder is usually predominantly a thermosetting material such as a straight phenolic resin, a modified phenolic resin or a cashew resin or, as is more likely, a mixture of these with rubber. Thus, the hardness of a straight phenolic binder can be modified by the presence of softer thermosetting resins such as oil modified phenolics or liquid cashew resin, or by a thermoplastic elastomer such as natural or synthetic rubber or by other suitable elastomeric materials. In any event, the binder ingredients are usually inclusive of solid particles such as partially cured phenol formaldehyde resin, partially cured cashew resin polymer solids, and vulcanizable diene rubber such as butadiene-styrene or butadiene acrylonitrile copolymer solids conventionally admixed with a solvent in order to obtain flowability sufficient to achieve uniform distribution of the potentially heat-settable binder throughout the remainder of the composition represented by the heat resistant, long wearing, strengthening, and friction enhancing and friction modifying filler particles.

It is customary under present practices to bake the mixture containing the solvent for a prolonged period of time at an elevated temperature to remove the solvent, so that adequate bond strength and density can be obtained in the finally cured end product. The difficulty with such procedures is lack of certainty for the end point of solvent removal, which is to say that the mixture may be (and sometimes is) baked more than necessary to remove solvent, resulting in disadvantageous effects, and in particular objectionable surface reactions.

This baking or drying operation also consumes a considerable amount of time and labor, and entails obvious capital expenditures, as can be well appreciated from the fact that the drying or solvent-removing operation sometimes requires more than fifty percent of the total time in processing a given batch of material to afford a composition friction element.

Moreover, the dies required for exerting heat and pressure conjointly for cure (referred to as "compression molding") not only entail a high initial cost, but are costly to maintain, and a large number are required for the many different shapes and sizes of friction elements encountered. These molds must be frequently opened for venting during the initial stages of final cure to permit the escape of trapped air and gases evolved during chemical reaction of the cure. While such venting is frequently done automatically, it becomes very difficult with the wide range of binder chemistry to determine the optimum time for venting, such that a compromise is always entailed. The final closure of the dies at the end of the venting cycle probably traps some traces of gases which are believed to react chemically with the binder in its final stage of cure. In the instance of a phenolic resin binder, the major portion of the cure reaction is one of condensation involving the elimination of water vapor during a "venting" sequence, in contrast to sulphur reaction gases eliminated during the early stages of cure for those binders involving rubber as a constituent. When both a phenolic resin and a rubber are employed for the binder, the curing reaction involves copolymerization and the chemistry becomes quite complex.

I have discovered that it is quite unnecessary to subject a mixture for a composition friction element, containing a solvent, to a purposeful dry-out or solvent removal step prior to compaction. To the contrary, I have found that retention of an appreciable amount of solvent, at the very time of compacting the mixture to its final density, aids greatly in imparting to the mixture a degree of mobility at room temperature which permits the mixture to be compacted to shape, virtually to theoretical density, and that the density obtained during this compaction is retained during subsequent cure within about 95% of the theoretical density value. It is not necessary to compact under heat in accordance with the present invention. Room temperatures are adequate, and it is only afterwards that the compacted mixture is subjected to a final bond cure.

Examination of molded friction elements made in this manner shows no evidence of unacceptable cracks, delaminations or voids. In fact, such moldings compare quite favorably with those made under heat and pressure conditions following the conventional dry-out technique heretofore deemed so essential to an acceptable composition friction element.

The cost savings under my process are substantial in that I need only use a stamping press to attain final density and desired shape, and the stamped mixture can be cured in conventional ovens or other suitable means. This equipment, though separate, enables much higher production rates to be achieved. Thus, the conventional compression molding presses entail several hours for processing a given batch whereas I attain final density in a matter of about a minute or less. In this connection, it is important to realize that the attainment of final density, near theoretical, when using conventional compression molding presses is really achieved in cycles over a period of several hours in that after such venting of the press to open the dies for escape of volatiles, there is some expansion of the body being pressed, or loss in density, due to the disruptive pressure of the evolved gases.

In other words, the conventional compression molding process can be viewed as one wherein densification and cure progresses in cycles over a relatively long period of time; but under the present invention I attain final density almost instantly, in about a minute, at least within the operating speed of the stamping dies and the rate at which the mixture can be compacted, and when completing the thermal cure I need use no more pressure than the slight amount which may be necessary to maintain the desired shape against warpage.

Accordingly, an object of the present invention is to produce composition friction elements composed of filler and strengthening ingredients together with a thermosetting bond, by subjecting the mixture containing solvent, to final density in a stamping die while the incompletely cured bond ingredient may be no warmer than room temperature. The pressed body, removed from the die, will maintain its density during final thermal cure without the need for any further densifying pressure. Thus, the mixture which I press is one in which the solid bond particles are quite plastic and adhesive such as to result in permanent deformation and sufficient cohesion between the bond and filler-strengthener particles that the pressed body will not "recover" or spring back during thermal cure even though gases may be evolved during the course of the chemical reactions characteristic of a final thermal cure of a reactive organic bond.

This phenomenon during stamping is to be compared to the reaction which takes place in conventional compression molding where the pressure of the dies, once released when venting the dies to expunge volatiles, must be reapplied in the next cycle of the conjoint action of heat and pressure necessary to reconsolidate the bond which becomes more and more viscous and really decreases in adhesive power as the cure reaction progresses.

In fact, the last stage in the conventional process is one where the bond becomes a continuous consolidated matrix with the fillers and strengtheners dispersed therein as a discontinuous phase. In contrast, the mixture which I stamp out in a quick stroke of the press and which is to be cured outside the stamping die, requires no further consolidation, since it is found that the bond is adequately bonding to itself and to the filler and strengthening particles. It is not until final cure, separately and outside the stamping press, that the bond ingredient in my process completely fuses into a continuous matrix, but in the meantime during thermal cure its adhesive-cohesive power continues to hold the whole mass together and maintain the stamped density even though gases exerting high vapor pressure are being interiorly generated.

Other and further objects of the present invention will be apparent from the following description and claims demonstrative of what is now considered to be the best mode contemplated for applying the principles of the present invention. Other embodiments of the invention embodying the same or equivalent principles may be used and changes may be made as desired by those skilled in the art without departing from the present invention.

In the drawings:

FIG. 1 is a sectional view of apparatus that may be employed in practicing the present invention;

FIG. 2 is an elevation, partly in section, of a finished railroad brake shoe; and FIG. 3 is a schematic sectional view of die equipment used to make the shoe shown in FIG. 2.

The following are examples of practices under and in accordance with the present invention:

| Material | Example (parts by weight) | |
|---|---|---|
|  | 1 | 2 |
| Binder (A) | 15 | 12.2 |
| White cast iron particles | 10.0 |  |
| Calcined kyanite | 10.0 | 13.0 |
| Lead sulphide | 19.5 | 22.5 |
| Lead | 4.6 | 5.6 |
| Calcined petroleum coke | 21.6 | 39.3 |
| Asbestos (Grade 4K) | 10.8 |  |
| Aloxite |  | 0.8 |
| Accelerator Activator: |  |  |
| Litharge | 3.4 | 2.7 |
| Zinc oxide | 5.1 | 4.2 |
| Naphtha (solvent) | 4.0 | 4.0 |

EXAMPLE 3 (BINDER A)

| Ingredient | Parts by weight |
|---|---|
| Buna-S (23½% styrene) | 44.0 |
| Cashew nut shell liquid polymer (intermediate stage of heat growth) | 44.0 |
| Rubber cure: |  |
| Sulphur | 8.8 |
| Benzothiazole disulphide | 0.91 |
| Copper dimethyl dithiocarbamate | 0.46 |
| Hexamethylenetetramine | 1.83 |

The above examples serve to demonstrate the latitude possible under the essentially physical operating conditions of the present invention. The cast iron particles and calcined kyanite are long wearing filler particles having a synergistic action explained in U.S. Patent No. 2,901,456; and hence, variations and substitutions are possible if this action is not necessary in the end use. The asbestos is a filler and also a strengthener. Lead, lead sulphide, graphite and coke are fillers present to display advantageous friction modifying and surface effects in the finished article when used in the intended manner in a brake installation, but again omissions and substitutions can be made dependent upon the degree of friction and modification thereof that may be deemed important.

In producing friction elements in accordance with Examples 1 and 2 bonded by the binder of Example 3, the rubber and cashew nut shell liquid polymer in a preliminary or uncured state are first worked together intimately in a mill after which the ingredients used to vulcanize, cure and set the binder and advance the liquid polymer are added thereto and the mixture transferred to a blade mixer. The naphtha solvent is then added to the ingredients affording the bond, the mixture agitated until a paste condition is obtained and then are added the fillers including the cast iron particles, calcined kyanite, the friction modifier and enhancer and the asbestos where such is to be used for enhancing body strength. Mixing is continued until a uniform composition is attained.

In accordance with the present invention, the mixture processed with solvent (about 4% by weight) as above described, may be pressed to final density without solvent removal. Due to ordinary evaporative losses, however, I find that the amount of solvent present at the time of compaction may be as low as 2% by weight of the mixture being compacted, and I prefer not to allow the solvent to be less than this at the time of compaction, since 2% by weight of solvent appears to be near the minimum for obtaining the degree of mobility which I want. Thus, after preparing the mixture with solvent at room temperature, the mixture containing solvent is ready to be compacted to its final density, at room temperature.

Referring to FIG. 1 there is shown a press 40 having a ram or punch 41 associated with a die 42 formed to have a die cavity 42C configured in accordance with the desired shape of a friction element, such as a railroad brake shoe, to be produced under the present invention. A selected amount of the mixture A, FIG. 1, containing no less than about 2% by weight of solvent, is added to the die cavity 42C, and this material may then be densified to about 95–98% theoretical density by the ram 41, at room temperature. Further in connection with densification in the press, it may be mentioned that the product undergoes compression to a 4:1 to 5:1 bulk factor. This is accomplished using up to three tons per square inch of pressure in the press.

The press 40 represented by the assembly 41–42 need not be heated to thermally cure the binder, and it is therefore unnecessary to periodically vent or release the ram 41 in order to permit the escape of volatiles. It may, however, be advantageous to open the press dies once to get rid of entrapped air, trapped by the initial lowering of the ram.

The shoe or like friction element consolidated in the press 40 is virtually devoid of porous areas approaching, as it does, theoretical density. The bond maintains this density after removal of the pressed body from the die.

The densified shapes formed from the press are to be subjected to a rapid and final cure in order to vulcanize or cure the binder to its final thermally cured state, resulting in the evolution of the volatile products characterizing the chemical reaction that occurs during cure of the bond. This can be done as a mere oven process (one-half to one hour at 350°–450° F. depending upon thickness) and no pressure is required to maintain density during the final cure. However, modest pressure (20 p.s.i.) may be applied during final cure to preserve geometry against warpage.

In comparison, it may be mentioned that the final cure heretofore specified for friction elements of the kind under consideration produced under conventional compression mold techniques is one of three hours exposure at the final curing temperature under a pressure of one ton per square inch in order to obtain a final cure state and densification comparable to what is achieved under the present invention.

A friction element as produced above is ordinarily affixed in one way or another to a metal backing which in turn enables the friction element to be mounted on a brake head or the like. Advantageously, however, I can simultaneously consolidate the mixture and bond the mixture to a backing in one step. Thus, referring to FIG. 2, a railroad brake shoe in finished form is identified at 50, including a steel back 51 and the essential friction element 52. Such an assembly can be attained, FIG. 3, by first disposing the separate backing on an anvil or fixed die 54 of the press 55 in which is next disposed the mixture 52A containing the mixture as above described in connection with FIG. 1. The anvil is shaped complementary to the geometry of the backing. Thereafter, the ram or movable die 56 is lowered on the mixture 52A with sufficient pressure to establish the desired final density. Again, no heat is required during the stamping operation, and the binder presents sufficient adhesive power to bond the lining 52 to the back 51. After stamping out the assembly in the press apparatus 55, the shoe is removed and subjected to final bond cure resulting in the finished shoe of FIG. 2.

It will be seen from the foregoing that in accordance with the present invention a friction element is produced from a mixture of solid filler particles and a thermally set binder obtained from an organic bond. The fillers may vary widely depending upon the ultimate use factors such as coefficient of friction, acceptable wear rate, and the like. The binder of course increases in tackiness with heat and becomes quite hard when finally cured under the preferred conditions specified, but the straight phenolic (phenol-formaldehyde) resin may be modified for a degree of softness.

The mixture of fillers and incompletely cured bond is prepared in the presence of a solvent, as to which at least about 2% by weight (of the mixture) is to be retained and presented at the time of compaction. Compaction is not accompanied by heat to effect a cure of the binder, and in fact is preferably carried out at room temperature. The compacted mixture, already at its final density, is removed from the die (FIG. 1) and then is subjected to a separate cure to harden the binder and establish the effective continuous binder phase in which the fillers are present as the discontinuous phase. No pressure is applied during final cure except that which may be advantageously employed to maintain the desired geometry.

Hence, while I have illustrated and described preferred embodiments of my invention, it is to be understood that these are capable of variation and modification.

I claim:

1. A method of producing a friction element having inorganic fillers dispersed in an elastomeric-resin binder, the binder being obtained from a mixture of a vulcanizable diene rubber and a thermosettable phenolic resin compatible therewith, said method comprising: mixing to a state of uniformity the fillers and the uncured binder in the presence of a solvent for the binder which renders the binder plastic, adhesive and mobile; transferring to a closed stamping die a predetermined amount of the uniform mixture thus obtained and compacting this mixture therein substantially to its final density without removing the solvent and without thermally advancing the binder to a cure stage where volatiles are evolved to any appreciable degree, the solvent content at the time of compaction being in the range of about 2 to 4% by weight of the mixture being compacted; relieving the densified mixture of compacting pressure and thereafter, without any intermediate heating at a lower temperature to remove solvent, subjecting the densified mixture in its relieved state to a temperature of at least about 350° F. to complete the thermal cure to harden the binder.

2. A method according to claim 1 in which the friction element is a railroad brake shoe.

3. A method according to claim 2 in which the die cavity contains a metal backing for the shoe.

4. A method according to claim 2 in which the binder is a mixture of butadiene-styrene rubber and cashew nut shell liquid polymer, the binder amounting to from about 12 to 15% by weight of the mixture on a solvent-free basis, and in which the mixture includes up to about 10.8% asbestos.

References Cited

UNITED STATES PATENTS

| | | |
|---|---|---|
| 2,078,617 | 4/1937 | Spokes. |
| 2,159,935 | 5/1939 | Sanders. |
| 2,273,770 | 2/1942 | Nanfeldt. |
| 2,391,416 | 12/1945 | Hart et al. |
| 2,534,607 | 12/1950 | Laher et al. |
| 2,539,631 | 1/1951 | Kuzmick. |
| 2,620,320 | 12/1952 | Novak et al. |
| 3,334,163 | 8/1967 | Gilbert _____ 264—122 |

JULIUS FROME, Primary Examiner

H. KOECKERT, Assistant Examiner

U.S. Cl. X.R.

260—33.6, 41.5; 264—122, 271, 347